United States Patent
Parkkinen et al.

(10) Patent No.: US 7,502,796 B2
(45) Date of Patent: Mar. 10, 2009

(54) ARRANGEMENT AND METHOD FOR OPTIMIZING PERFORMANCE AND DATA SAFETY IN A HIGHLY AVAILABLE DATABASE SYSTEM

(75) Inventors: Jarmo Parkkinen, Helsinki (FI); Antoni Wolski, Kirkkonummi (FI)

(73) Assignee: Solid Information Technology Oy, Helsinki (FI)

( * ) Notice: Subject to any disclaimer, the term of this patent is extended or adjusted under 35 U.S.C. 154(b) by 603 days.

(21) Appl. No.: 10/867,656

(22) Filed: Jun. 16, 2004

(65) Prior Publication Data

US 2005/0283522 A1 Dec. 22, 2005

(51) Int. Cl.
*G06F 17/30* (2006.01)
(52) U.S. Cl. ................ 707/10; 707/201; 707/205; 709/203
(58) Field of Classification Search ........... 707/1, 707/10, 100, 200, 201, 203, 205; 709/210, 709/203

See application file for complete search history.

(56) References Cited

U.S. PATENT DOCUMENTS

| | | | |
|---|---|---|---|
| 6,901,481 B2 * | 5/2005 | Olson | 711/129 |
| 2002/0165724 A1 * | 11/2002 | Blankesteijn | 705/1 |
| 2002/0194015 A1 * | 12/2002 | Gordon et al. | 705/1 |
| 2003/0041074 A1 * | 2/2003 | Vasudevan et al. | 707/204 |
| 2004/0205083 A1 * | 10/2004 | Andrews | 707/102 |
| 2005/0071391 A1 * | 3/2005 | Fuerderer et al. | 707/204 |

\* cited by examiner

*Primary Examiner*—Cheryl Lewis
(74) *Attorney, Agent, or Firm*—Young & Thompson (57) ABSTRACT

A method and arrangement for optimizing performance and data safety in a system includes first and second database servers coupled to a communication network. The first database server accepts transactions from a client application, stores them according to a data storage method, and sends them to the second database server via the communication network, whereupon the second database server also store the transactions. The first database server receives information about the server availability state of the second database server and detects changes in the availability state of the second database server in a such manner, that the data storage method of the first database server is changed according to the change in the availability state of the second database server.

39 Claims, 5 Drawing Sheets

ARRANGEMENT AND METHOD FOR OPTIMIZING PERFORMANCE AND DATA SAFETY IN A HIGHLY AVAILABLE DATABASE SYSTEM

TECHNICAL FIELD OF THE INVENTION

This invention relates generally to a highly available database management systems (DBMS) and storage level software processes related to DBMS, and more particularly selecting an appropriate transaction logging method based on overall state of the system.

BACKGROUND OF THE INVENTION

Database systems may be built either as a stand-alone system utilizing hardware resources of only one computer system (typically consisting of CPU, communication means and disk system) or as a fault-tolerant system where fault-tolerance is achieved by the computer system redundancy.

To achieve redundancy, a copy of the data managed by the database system needs to be maintained on at least one backup computer system.

Data redundancy in a fault-tolerant database system is typically achieved with data replication where all transactions that are executed in the primary database, are also executed in the secondary database(s). The replication may be synchronous or asynchronous. In synchronous replication, the transaction is replicated to the secondary database as it happens in the primary database. In practise, the primary server must wait for an acknowledgement from the secondary database before it can report successful transaction execution to the client application. This replication method is also known as 2-safe replication. In asynchronous replication, the primary server may send data to the secondary server and continue its operation without receiving acknowledgement about receipt of the transaction(s) from the secondary server. This replication method is also known as 1-safe replication.

Another essential property of a data management system is data persistence. It is typically achieved by writing the committed transactions to a transaction log that typically resides in a non-volatile memory such as disk drive. The performance characteristics of a disk drive are such that writing one byte of data to the disk is about equally expensive in terms of performance than writing a larger chunk, e.g. 8 kilobytes. In other words, the number of write operations has higher impact on the performance than the volume of data to be written. To maximize the data durability, all transactions must be written to the disk as they occur. However, as explained above, such disk use may be non-optimal in terms of performance. To maximize the speed of the transaction log write operations, the number of disk write operations should be minimized and each write operation should write larger chunk of transactions' data to the disk. This can be achieved by buffering the data write operations in volatile memory and trigger the actual disk write operation after enough data has been accumulated or enough time has elapsed since the previous disk write operation. The down side of transaction log buffering is that committed transactions that have not yet been written to the disk, are lost in exceptional situations, for example if the database server process fails abruptly or the server hardware loses power.

The database servers of the fault-tolerant database system may have different states depending on what is the status (availability state) of the replication in the system. In this document, following exemplary states are used:

PRIMARY ACTIVE—server availability state, where primary server is connected to the secondary server and is able to send transactions to it. All transactions are committed in both primary and secondary servers.

SECONDARY ACTIVE—server availability state, where secondary server is connected to the primary server and is able to receive transactions from it. All transactions are committed in both primary and secondary servers.

PRIMARY ALONE—server availability state, where primary server queues transactions for later sending to the secondary server. Server is able to execute the transactions but it constitutes a single point of failure.

STANDALONE—server availability state, where server is currently not part of a fault tolerant database system. Server is able to execute transactions but it constitutes a single point of failure, Of these states, PRIMARY ACTIVE, PRIMARY ALONE and STANDALONE are states where a DBMS may accept write transactions and are applicable in this context, PRIMARY ACTIVE is a state where the server is not a single point of failure, i.e. there's at least one another, secondary server (that is in SECONDARY ACTIVE state) available to immediately take over if the primary fails. If the state is PRIMARY ALONE or STANDALONE, then the server is a single point of failure, meaning that if the server becomes unavailable, there is no other server to immediately continue the service from the point where the failed server ended.

A typical fault-tolerant data management system of prior art consists of a primary database and at least one secondary database to which the transactions are replicated using 1-safe or 2-safe replication. If data loss in server failure situations is not acceptable, then the replication method must be 2-safe replication. For ensuring persistence, the servers may use either unbuffered or buffered transaction log write modes. However, the buffered transaction logging mode does not guarantee data persistence if the other database server of the system fails for any reason. To guarantee data persistence in all possible situations, unbuffered logging must be used. This, however, has an adverse effect on the performance in "normal use" where both servers are functioning properly. The performance difference between buffered and unbuffered disk writes may be several hundred per cent.

Figure 1:
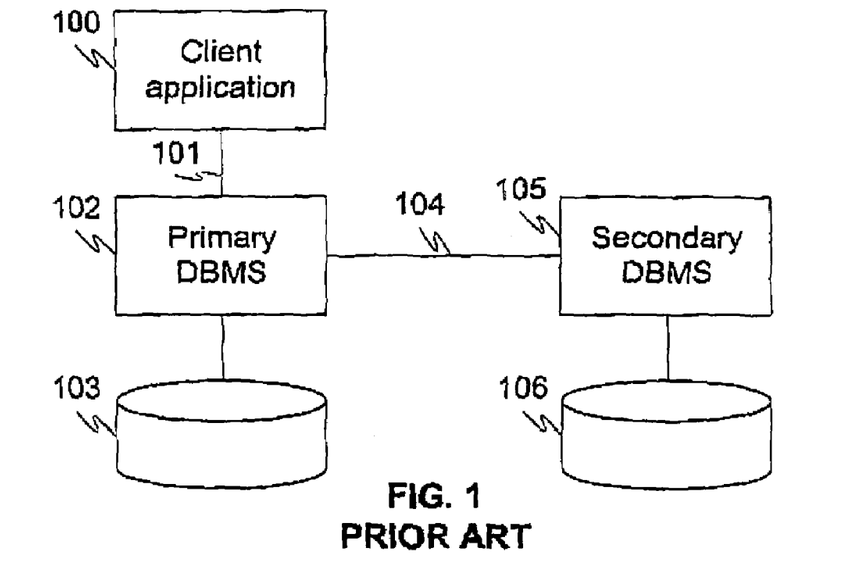
FIG. 1 depicts an exemplary system arranged to provide a fault-tolerant database system according to prior art.

FIG. 1 depicts an exemplary fault-tolerant database system known from the prior art. A client application 100 is connected to primary DBMS 102 via some communication means 101, such as a network connection. The primary DBMS 102 has access to a persistent storage 103 and it is connected to a secondary DBMS 105 via some communication means 104, most typically a network connection. The primary DBMS 102 is arranged to replicate transactions to the secondary DMBMS 105 in synchronous and/or asynchronous manner. The secondary DBMS 105 has access to its own persistent storage 106.

Figure 2:
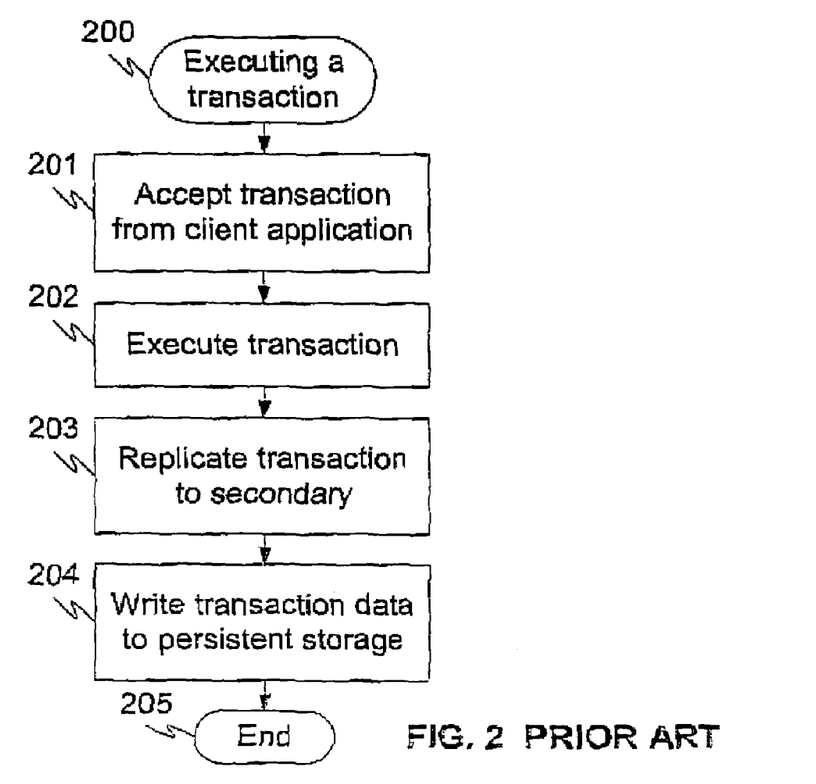
FIG. 2 is a flow diagram about method of executing a transaction in a fault-tolerant database system according to prior art.

The flow diagram of FIG. 2 illustrates the basic operations involved when executing a transaction in a fault-tolerant manner. In step 201, the primary DBMS 102 accepts a transaction from client application 100, executes 202 the transaction in the primary DBMS, replicates 203 the transaction to the secondary DBMS and writes 204 the transaction data to its persistent storage 103. It should be noted that steps 201, 202, 203 and 204 may occur also in different order than shown in the drawing and that a transaction may be accepted from the client application in multiple steps 201 and where each of the execution step 202 may involve data replication 203 and data write operations 204 to storage device.

Figure 3:
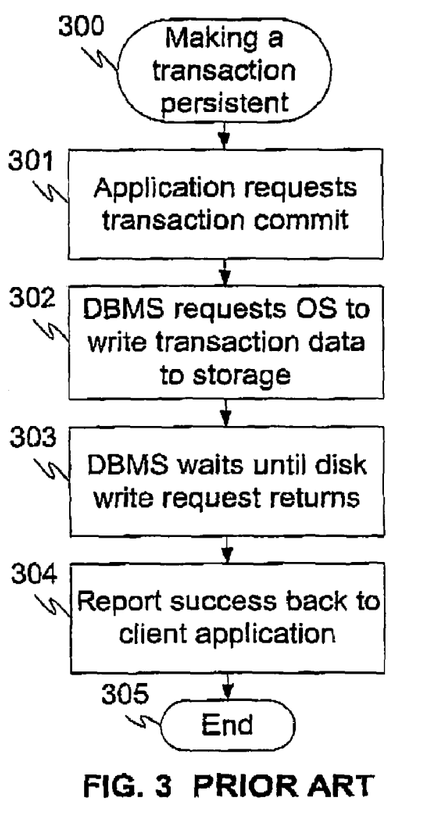
FIG. 3 is a flow diagram about making a transaction persistent using unbuffered storage method according to prior art.

The FIG. 3 depicts in a form of a flow diagram the method of unbuffered writing of transaction data to storage device known from prior art. The client application 100 requests 301 a transaction to be committed by the DBMS 102 or 105. To commit the transaction in the local database, the DBMS requests 302 operating system to write the data of the transaction to the storage device 103 or 106. The DBMS waits 303 until the operating system has successfully written the data to the storage device. Upon receiving 304 the success info from the operating system, the DBMS reports to client application that the transaction was successfully committed.

Figure 4:
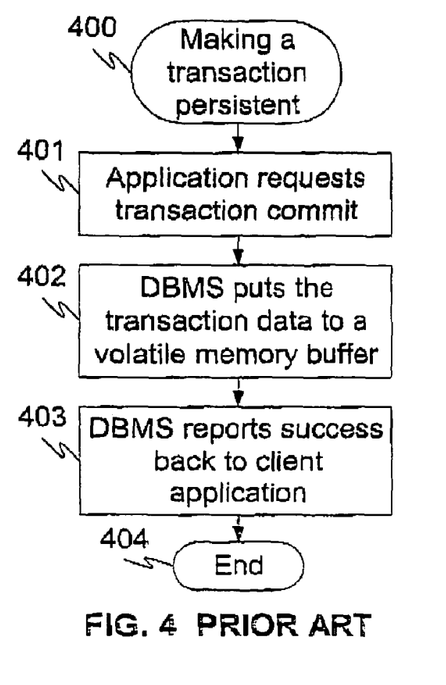
FIG. 4 is a flow diagram about making a transaction persistent using buffered storage method according to prior art.

In FIG. 4, a buffered transaction log write method known from the prior art is explained. In step 401, client application 100 requests a transaction commit. Upon this request, the DBMS 102 or 105 writes 402 the transaction data to a volatile memory buffer and reports 403 immediately success back to client application.

The methods of the prior art described above do provide either guaranteed persistence of data in all situations via unbuffered data write operations or high performance via buffered data write operations, but they don't allow selecting the optimal method based on the current availability state of the servers.

SUMMARY OF THE INVENTION

The invention presented here contains a method and system for optimizing the write performance of a highly available database system while keeping the system protected from data loss in case of failure of a single computer of the system.

The system consists of at least two database servers, each capable of storing transactions to a storage device in buffered and unbuffered manner. The database servers are arranged to have a role of primary server and a secondary server. A primary server is capable of accepting transactions from client applications, executing these transactions and sending them further to at least one secondary server over a communications network.

The primary server accepts a transaction from a client application. Upon receiving the transaction, the primary server executes it. As part of the transaction execution, the primary server replicates the write operations of the transaction to at least one secondary server and writes the transaction's data to the persistent storage such as disk drive. Depending on the success of the replication operations of the transaction, appropriate disk write mode is selected for the transaction log write operation. If the primary server is able to successfully send the transaction to the secondary server, the transaction to the local transaction log file is written in buffered disk write mode. If the primary server is not able to send the transaction to the secondary server, either because of an error in the send operation or because the server availability state has been changed from PRIMARY ACTIVE to something else, for example PRIMARY ALONE, the transaction to the local transaction log file is written in unbuffered disk write mode.

The invention relates to a method for optimizing performance and data safety in a system comprising a first and at least one second database server being coupled with a communication network, the first database server accepting at least one transaction from a client application, storing the said transaction according to a data storage method, said first database server being adapted to send the transaction to the second database server via the communication network and the second database server adapted to store said transaction, the method comprising steps of: the first database server receiving information about the server availability state of the second database server and detecting a change in said availability state of the second database server in a such manner, that the data storage method of the first database server is changed according to said change in the availability state of the second database server.

The invention relates also to an arrangement for optimizing performance and data safety, where the arrangement comprises a first and at least one second database server being coupled with a communication network, the first database server being adapted to accept at least one transaction from a client application, store the said transaction according to a data storage method, said first database server being adapted to send the transaction to the second database server via the communication network and the second database server adapted to store said transaction, wherein the first database server is further adapted to receive information about the server availability state of the second database server and detect a change in said state of the second database server in a such manner, that the data storage method of the first database server is changed according to said change in the availability state of the second database server.

Further the invention relates also to a first database server for optimizing performance and data safety in an arrangement, where the arrangement comprises said first and at least one second database server being coupled with a communication network, the first database server being adapted to accept at least one transaction from a client application, store the said transaction according to a data storage method, and being adapted to send the transaction to the second database server via the communication network, wherein the first database server is further adapted to receive information about the server availability state of the second database server and detect a change in said availability state of the second database server in a such manner, that the data storage method of the first database server is changed according to said change in the availability state of the second database server.

Furthermore the invention relates also to a computer program product for optimizing performance and data safety in a system comprising a first and at least one second database server being coupled with a communication network, where the computer program product, when run in the first database server, is adapted to accept at least one transaction from a client application, store the said transaction according to a data storage method, and send the transaction to the second database server via the communication network, wherein the computer program product, when run in the first database server, is further adapted to receive information about the server availability state of the second database server and detect a change in said availability state of the second database server in a such manner, that the data storage method of the first database server is changed according to said change in the availability state of the second database server.

In addition the invention relates also to a watchdog application for optimizing performance and data safety in a system comprising a first and at least one second database server being coupled with a communication network, the first database server being adapted to accept at least one transaction from a client application, store the said transaction according to a data storage method, said first database server being adapted to send the transaction to the second database server via the communication network and the second database server adapted to store said transaction, wherein the watchdog application is further adapted to monitor the server availability state of the second database server and detect a change in said availability state of the second database server in a such manner, that the data storage method of the first database server is changed according to said change in the availability state of the second database server.

The data storage method in this document means the method, whether data is stored to a persistent storage in buffered mode or data unbuffered mode.

In one preferred embodiment of the invention a watchdog application sets the server availability state of a DBMS to PRIMARY ALONE, which causes the database server to adjust its persistence mode to unbuffered log writes.

In another preferred embodiment of the invention a watchdog application sets the server availability state of a DBMS to PRIMARY ACTIVE, which causes the database server to set its persistence mode to buffered log writes.

The main benefit of the invention is to automatically allow maximum performance for database write transactions if there is no single point of failure in the system and ensure full persistence of data at the cost of performance in the system if for some reason a database becomes a single point of failure.

These features are most beneficial in embodiments designed for telecommunications and embedded use.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An embodiment of the invention will be described in detail below, by way of example only, with reference to the accompanying drawings, of which

DETAILED DESCRIPTION OF THE DRAWINGS

The FIGS. 1-4 have been explained in the "background of the invention" section of this document.

Figure 5:
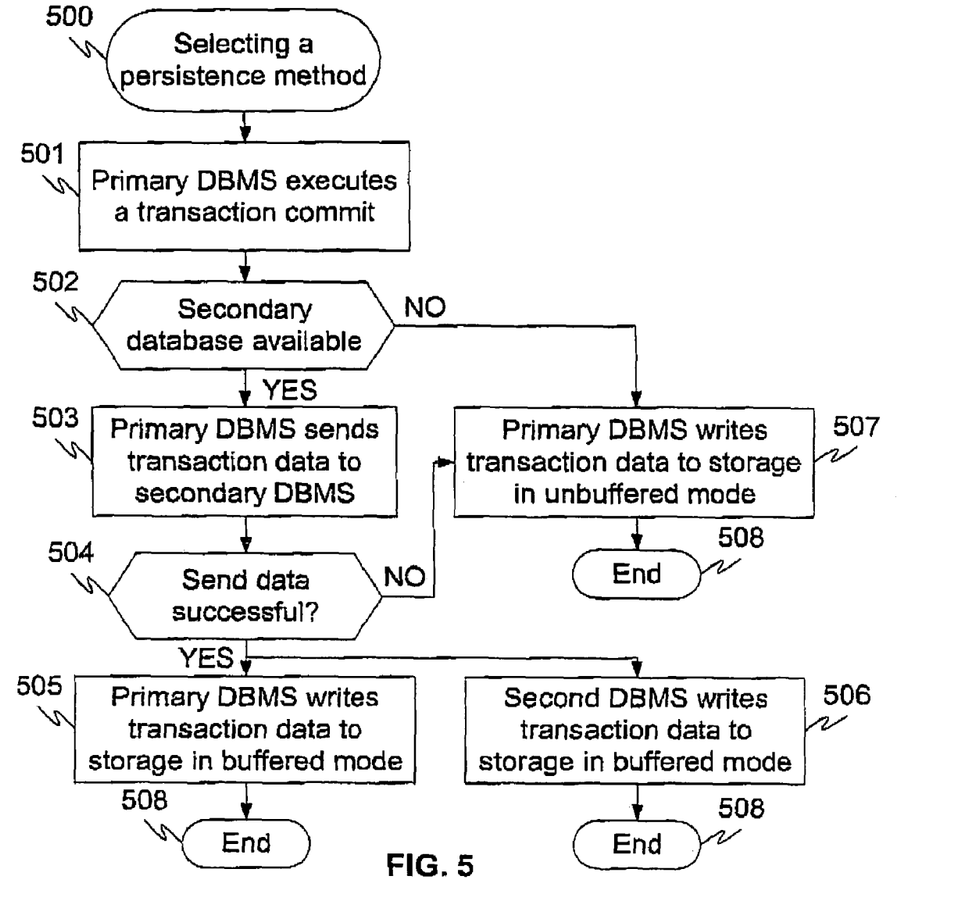
FIG. 5 depicts the method of selecting appropriate persistence method according to the invention.

In FIG. 5 is depicted the method of optimizing the persistence and performance of a fault tolerant database system based on the availability of the secondary server. The primary database server receives a transaction commit request 501 from a client application 100. Upon commit request, the primary DBMS 102 checks if the secondary database is available 502. Primary DBMS can determine this from its own server availability state. If the state is PRIMARY ACTIVE, it means that the secondary DBMS 105 is available for receiving and executing the transaction. Now the primary DBMS may send 503 the transaction data including commit request to the secondary DBMS. If this replication operation is successful 504, both primary DBMS 102 and secondary DBMS 105 may write the transaction data to the transaction log file on persistent storage device using buffered persistence method as described in the prior art, FIG. 4. On the other hand, if sending the data from primary DBMS to the secondary DBMS fails for any reason 504, the transaction must be written into the transaction log file of the storage device 103 of the primary DBMS 102 using unbuffered storage method 507 as described in the prior art, FIG. 3.

Figure 6:
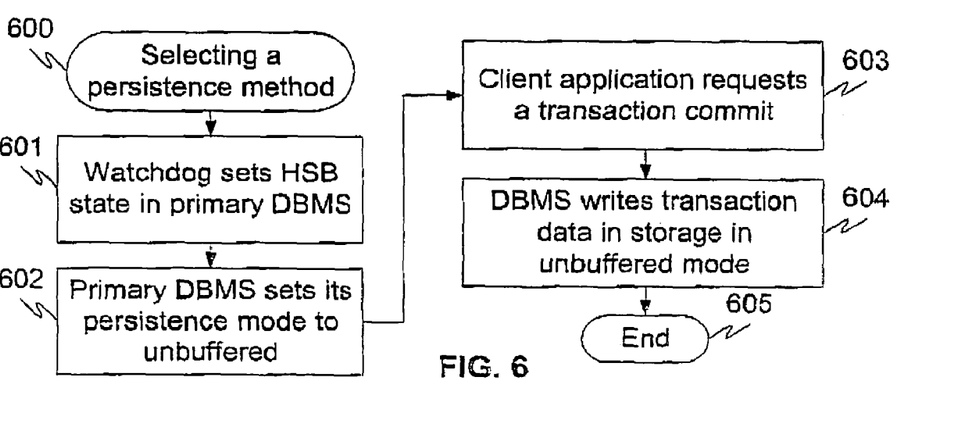
FIG. 6 depicts another embodiment of the method of selecting appropriate transaction persistence method according to the invention.

Another embodiment of the invention is illustrated in FIG. 6. As shown in the FIG. 8, there may be a watchdog application whose task is to monitor current state of the servers of the fault-tolerant database system. If the watchdog detects that there is a problem in either servers or the DBMSs 102,105 or in the communication 104 between the DBMSs, the watchdog may set 601 the server availability state accordingly. Now the primary DBMS may set its storage write mode to unbuffered 602. When the client application 100 now issues a commit request 603, the primary DBMS writes the transaction data to the transaction log file of the storage device 103 of the primary DBMS 102 in unbuffered mode 604.

Figure 7:
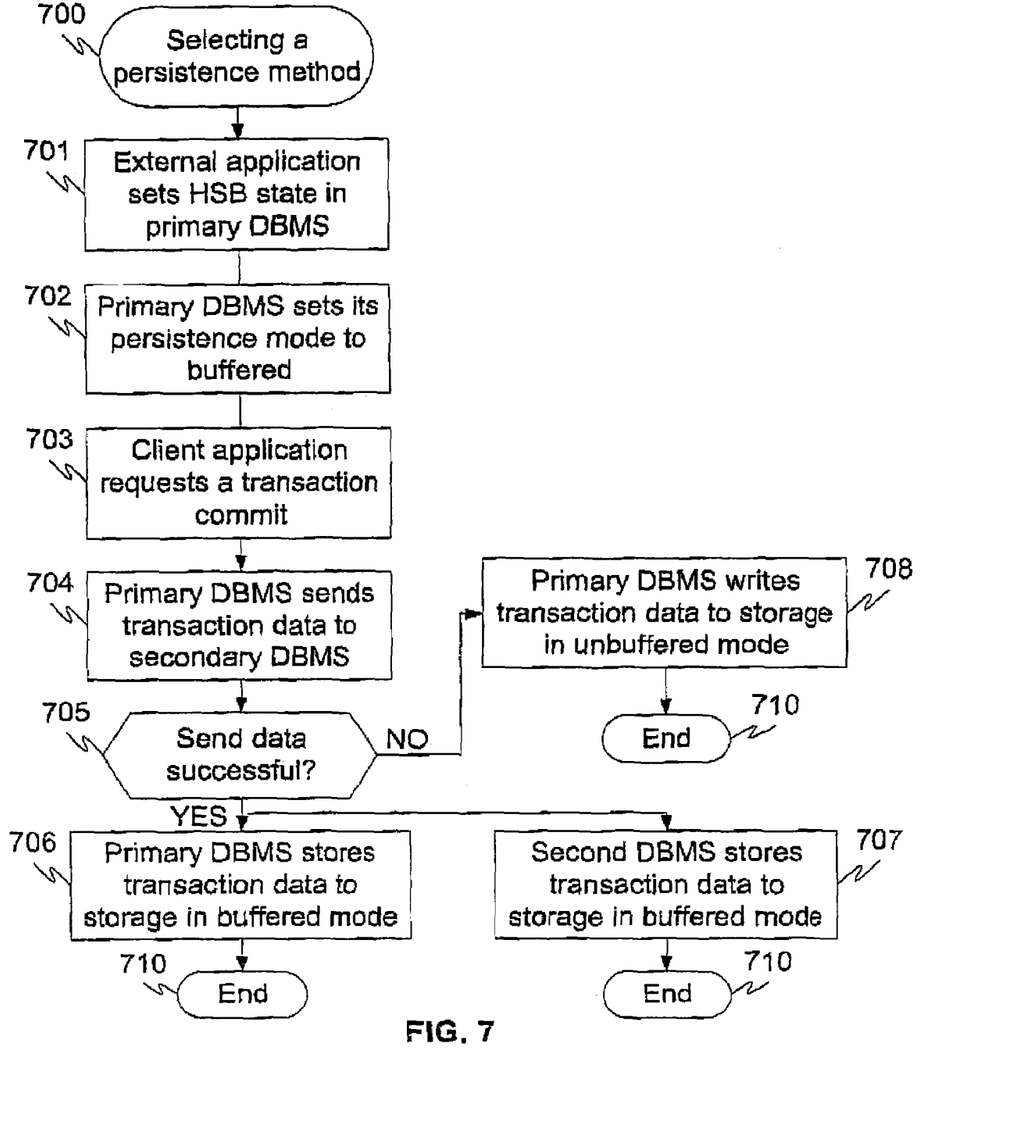
FIG. 7 depicts yet another embodiment of the method of selecting appropriate transaction persistence method according to the invention.

FIG. 7 shows yet another embodiment of the invention. The primary DBMS 102 may be in PRIMARY ALONE or STANDALONE state and an external watchdog application detects that the secondary DBMS 105 has become available and may be connected with the primary DBMS. The watchdog application establishes the connection between the database servers causing thus the state of the primary DBMS to change to PRIMARY ACTIVE 701. Now the primary DBMS may set its persistence method to buffered 702. Now when a client application issues a commit request 703 of a transaction, the primary DBMS sends transaction data 704 to secondary DBMS. If the send data operation is successful 706, both primary and secondary DBMSs may write the transaction data to the persistent storage 103, 106 in buffered mode 706,707. However, if an error occurs in the data replication operation 704, the state of primary DBMS is changed to PRIMARY ALONE 708 and the primary DBMS writes the transaction data to its storage in unbuffered mode.

Figure 8:
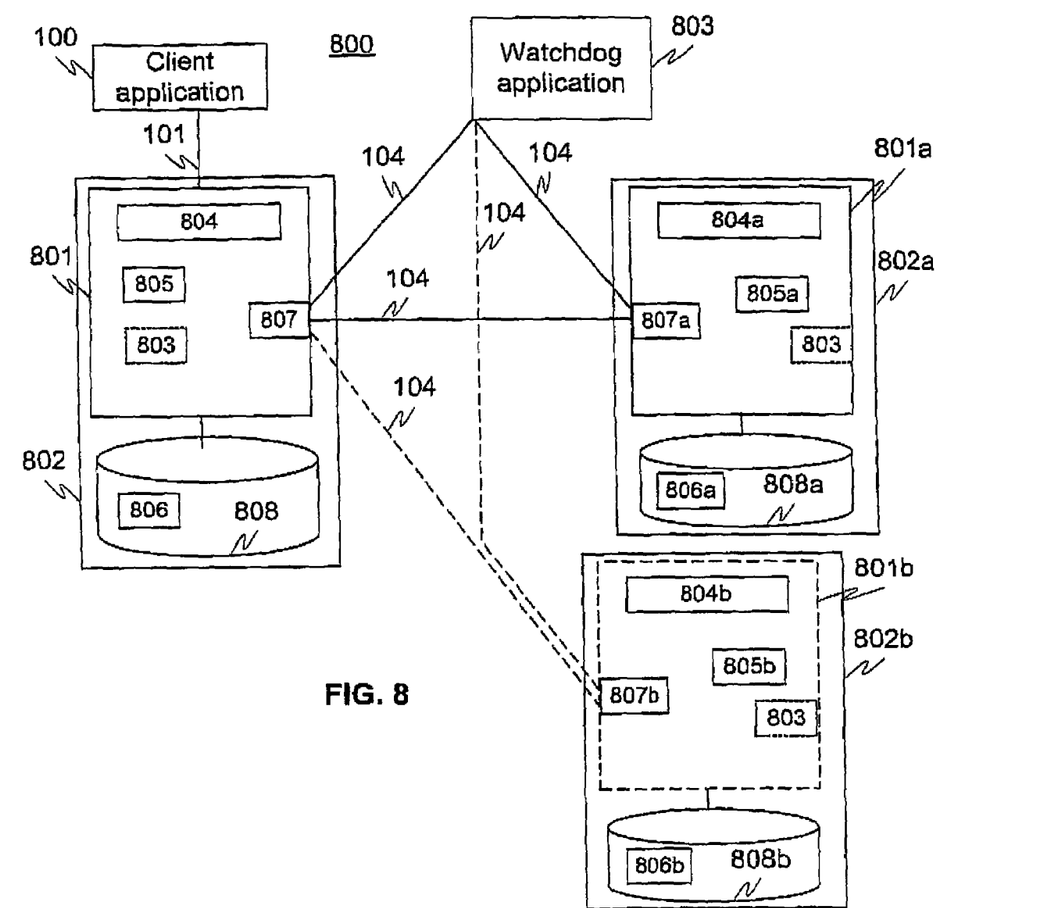
FIG. 8 illustrates an exemplary arrangement for optimising the write performance of a highly available database system according to an advantageous embodiment of the present invention.

FIG. 8 illustrates an exemplary database arrangement 800 for optimising the write performance of a highly available database system according to an advantageous embodiment of the present invention, where the arrangement comprises at least two database servers, namely a primary server 802 and at least one secondary server 802a, 802b with appropriate database management systems (DBMS) 801, 801a, and 801b. The primary server 802 (with the appropriate DBMS 801) is adapted to communicate with a client application 100 in such a manner that the client application is able to commit transactions to be executed to the primary server 802 via communication network 101. When receiving a transaction the primary server 802 executes it by execution means 804.

Moreover according to an embodiment of the invention the arrangement comprises a watchdog application 803, which is adapted to monitor current state of the servers 802, 802a (802b and etc, if there are plurality of secondary servers) and DBMS 801, 801a, 801b of the fault-tolerant database system.

According to an embodiment of the invention the watchdog may be an external part 803, but optionally it may be integrated in the primary server 802, or even secondary servers 802a, 802b. In an arrangement, where the watchdog application 803 is integrated in the primary (and optionally also in secondary) server, the primary server advantageously receives information about the server availability state of the secondary server directly from the said secondary server.

Now, if the watchdog 803, either external or internal, detects that there is a problem in either the server 802, 802a, 802b, or DBMS 801, 801a, 801b or in the communications 104 between the servers, the watchdog is adapted to set the server availability states of the servers 802, 802a, 802b in a server availability state register 805, 805a, 805b accordingly (from available to unavailable). In this case, if problems are detected, the primary server is adapted to set its storage write mode automatically to unbuffered, whereupon it writes the transaction data to the transaction log file 806 in unbuffered mode and again to the volatile memory means 809.

When the watchdog 803 detects that the server 802, 802a and the communication 104 between the servers are healthy, the watchdog is adapted to set the server availability states of the servers 802, 802a in a server availability state register 805, 805a, 805b accordingly (from unavailable to available). In this case the primary server is adapted to set its storage write mode automatically to buffered, whereupon it writes the transaction data to the transaction log file 806 in buffered mode, Furthermore the primary server is arranged to replicate either write operations of the transaction or the transaction itself to at least one secondary server 802a, 802b via communication means 807, 807a, and 807b, respectively, and over communication network 104, whereupon the secondary server(s) execute(s) the transaction by execution means 804a (804b) and write(s) the transaction data to the transaction log file 806a (806b) in buffered mode. After enough data has been accumulated to the transaction log file 806, 806a, 806b in buffered mode or enough time has elapsed since the previous disk write operation, a written operation to the volatile memory means 809, 809a and 809b is performed. The written operation can be also triggered, if the watchdog detects some malfunction or problems in the arrangement 800. For example, if there is detected some problems in the secondary server, the secondary server is adapted to write the transaction data to the transaction log file 806a, 806b in unbuffered mode and again directly to the volatile memory means 809a, 809b.

However, it should be noted that according to an embodiment of the present invention the watchdog application 803 (either external or internal) can instruct the primary server (and according to an embodiment also secondary servers) to change the data storage method appropriately between unbuffered and buffered mode.

Furthermore, it should be noted that according to the present invention operations and transactions to be executed and mentioned above can be executed either by the database servers or by respective DBMS, or at least partly by the database servers and by respective DBMS.

Figure 9:
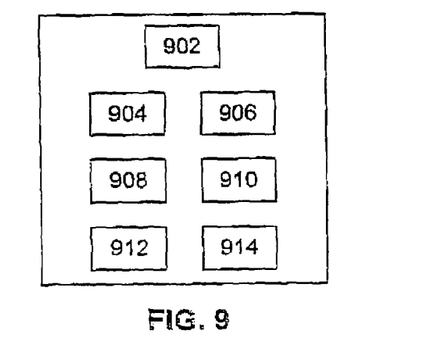
FIG. 9 illustrates an exemplary computer program product for optimising the write performance of a highly available database system according to an advantageous embodiment of the present invention.

FIG. 9 illustrates an exemplary computer program product 900 for optimizing performance and data safety in a system comprising a first 802 and at least one second database server 802a, 802b being coupled with a communication network, where the computer program product 900, when run in the first database server 802, is adapted to accept and execute at least one transaction from a client application by executing means 902, store the said transaction by storing means 904 according to a data storage method, and send the transaction to the second database server via the communication network using communication means 906. The computer program product, when run in the first database server, is further adapted to receive information about the server availability state of the second database server and detect a change in said availability state of the second database server by detecting means 908 in a such manner, that the data storage method of the first database server is changed according to said change in the availability state of the second database server.

The computer program product, when run in the first database server, is also adapted to receive information about the server availability state of the second database server from an external application or an internal application, or alternatively directly from the said second database server by communication means 906. Moreover the computer program product, when run in the first database server, is adapted to change the availability state of the second database server from available to unavailable by availability state changing means 910, when there exist problems in the second database server or in the communication network between the first and second database servers, and to change the availability state of the second database server from unavailable to available, when the second database server or the communication network between the first and second database servers are healthy. Further the computer program product, when run in the first database server, is adapted to change the data storage method from buffered to unbuffered disk write method by buffer changing means 912, when the availability state of the second database server is changed to unavailable, and to change the data storage method from unbuffered to buffered disk write method, when the availability state of the second database server is changed to available.

Still the computer program product, when run in the first database server, is adapted to change the data storage method of the first database server automatically by storage method changing means 914 upon detecting a change of availability state of the second database server, and also to instruct the computer program product, when run in the first database server, to change the data storage method of the first database server upon detecting a change of availability state of the second database server. Furthermore the computer program product, when run in the first database server, is adapted to store buffered transactions after data has been accumulated over predetermined quantity or predetermined time limit has been passed since the previous disk write operation by storing means 904.

The used communication networks 101, 104 may for example be wired or wireless information network and they can be implemented to work in a telecommunication system, which is compliant with at least one of the following: TCP/IP, Ethernet, CDMA, GSM, HSCSD, GPRS, WCDMA, EDGE, Bluetooth, UMTS, Teldesic, Iridium, Inmarsat, WLAN, DIGI-TV, and imode. It is also preferable to use a standardized operating system in the devices, such as primary and secondary servers. The operating system of devices may be, for example, Unix, MS-Windows, EPOC, Symbian, NT, MSCE, Linux, VxWorks, ChorusOS, PalmOS, Elate, NetBSD, FreeBSD, OSE, QNX and GEOS.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps, which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is intention, therefore, to be limited only as indicated by scope of the claims appended hereto.

The invention claimed is:

1. A method for optimizing performance and data safety in a system comprising a first and at least one second database server being coupled with a communication network, comprising the steps of:
   the first database server accepting at least one transaction from a client application;
   the first database server attempting sending the transaction to the second database server via the communication network to replicate the transaction on the second database server before the transaction is stored in the first database server;
   the first database server determining one of i) a success and ii) a non-success, of the sending the transaction to the second database server to replicate the transaction on the second database server; and
   based on said determination of sending the transaction to the second database server, the first database server storing the transaction in a persistent storage according to a data storage method in one of a buffered disk write mode and an unbuffered disk write mode.

2. A method according to claim 1 where the second database server is adapted to store said transaction according to a data storage method of its own.

3. A method according to claim 1 where the first database server receives information about the server availability state of the second database server from at least one of the following: an external application, an internal application, and directly from said second database server.

4. A method according to claim 1 where the availability state of the second database server is changed from available to unavailable, when there exist problems in the second database server or in the communication network between the first and second database servers, and the availability state of the second database server is changed from unavailable to available, when the second database server or the communication network between the first and second database servers are healthy.

5. A method according to claim 1 where the data storage method is changed from buffered to unbuffered disk write method, when the availability state of the second database server is changed to unavailable, and the data storage method is changed from unbuffered to buffered disk write method, when the availability state of the second database server is changed to available.

6. A method according to claim 1 where the change of the data storage method of the first database server is performed automatically by the first database server upon detecting a change of availability state of the second database server.

7. A method according to claim 1 where the change of the data storage method of the first database server is instructed by an external application.

8. A method according to claim 1 where the first and second database servers are triggered to store buffered transactions after data has been accumulated over predetermined quantity or predetermined time limit has been passed since the previous disk write operation.

9. The method of claim 1, wherein,
   said storing of the transaction by the first database server by the data storage method of the buffered disk write mode for the determination being the success of the sending the transaction to the second database server, and
   said storing of the transaction by the first database server by the data storage method of the unbuffered disk write mode for the determination being the non-success of the sending 10. The method of claim 1, wherein, said determination step includes the steps of:
    the first database server receiving information about the server availability state of the second database server,
    detecting a change in said availability state of the second database server, and
    changing the data storage method of the first database server between buffered disk write and unbuffered disk write modes according to said detected change in the availability state of the second database server.

11. The method of claim 1, wherein, said determination step includes the steps of:
    the first database server receiving information that the second database server is unavailable,
    based on the information that the second database server is unavailable, the determination of the first database server being the non-success of the sending the transaction to the second database server to replicate the transaction on the second database server, and
    the first database server changing the data storage method of the first database server from the buffered write mode to the unbuffered disk write mode.

12. The method of claim 11, wherein, said determination step includes the steps of:
    the first database server receiving information that the second database server is available,
    based on the information that the second database server is available, the determination of the first database server being the success of the sending the transaction to the second database server to replicate the transaction on the second database server, and
    the first database server changing the data storage method of the first database server from the unbuffered write mode to the buffered disk write mode.

13. An arrangement for optimizing performance and data safety, where the arrangement comprises:
    a first and at least one second database server being coupled with a communication network,
    the first database server being adapted to accept at least one transaction from a client application, store said transaction according to a data storage method,
    said first database server being adapted to send the transaction to the second database server via the communication network and the second database server adapted to receive the data of said transaction to replicate the data of the transaction on the second database server before the data of the transaction is stored in the first database server, wherein:
    the first database server is further adapted to i) receive information about the server availability state of the second database server, ii) to detect a change in said availability state of the second database server, and iii) to change the data storage method of the first database server, for storing the data of the transaction in a persistent storage, between buffered disk write and unbuffered disk write modes according to said detected change in the availability state of the second database server.

14. An arrangement according to claim 13 where the second database server is adapted to store said transaction according to a data storage method of its own.

15. An arrangement according to claim 13 where the first database server is adapted to receive information about the server availability state of the second, database server from at least one of the following: an external application, an internal application, and directly from said second database server.

16. An arrangement according to claim 13 where the availability state of the second database server is adapted to be changed from available to unavailable, when there exist problems in the second database server or in the communication network between the first and second database servers, and the availability state of the second database server is adapted to be changed from unavailable to available, when the second database server or the communication network between the first and second database servers are healthy.

17. An arrangement according to claim 13 where the data storage method is adapted to be changed from buffered to unbuffered disk write method, when the availability state of the second database server is changed to unavailable, and the data storage method is adapted to be changed from unbuffered to buffered disk write method, when the availability state of the second database server is changed to available.

18. An arrangement according to claim 13 where the first database server is adapted to change the data storage method of the first database server automatically upon detecting a change of availability state of the second database server.

19. An arrangement according to claim 13 where an external application is adapted to instruct the first database server to change the data storage method of the first database server upon detecting a change of availability state of the second database server.

20. An arrangement according to claim 13 where the first and second database servers are adapted to store buffered transactions after data has been accumulated over predetermined quantity or predetermined time limit has been passed since the previous disk write operation.

21. A first database server for optimizing performance and data safety in an arrangement, where the arrangement comprises:
said first and at least one second database server being coupled with a communication network,
the first database server being adapted i) to accept at least tranz one transaction from a client application, ii) to send the transaction to the second database server via the communication network so that the second database server receives the data of said transaction to. replicate the data of the transaction on the second database server before the data of the transaction is stored in the first database server, and iii) to store said transaction in a persistent storage according to a data storage method, the storage being subsequent to send the transaction to the second database server, wherein:
the first database server is further adapted to receive information about the server availability state of the second database server, detect a change in said availability state of the second database server, and change the data storage method of the first database server, to the persistent storage, between buffered disk write and unbuffered disk write modes according to said detected change in the availability state of the second database server.

22. A first database server according to claim 21 where the first database server is adapted to receive information about the server availability state of the second database server from at least one of the following: an external application, an internal application, and directly from said second database server.

23. A first database server according to claim 21 where the availability state of the second database server is adapted. to be changed from available to unavailable, when there exist problems in the second database server or in the communication network between the first and second database servers, and the availability state of the second database server is adapted to be changed from unavailable to available, when the second database server or the communication network between the first and second database servers are healthy.

24. A first database server according to claim 21 where the data storage method is adapted to be changed from buffered to unbuffered disk write method, when the availability state of the second database server is changed to unavailable, and the data storage method is adapted to be changed from unbuffered to buffered disk write method, when the availability state of the second database server is changed to available.

25. A first database server according to claim 21 where the first database server is adapted to change the data storage method of the first database server automatically upon detecting a change of availability state of the second database server.

26. A first database server according to claim 21 where an external application is adapted to instruct the first database server to change the data storage method of the first database server upon detecting a change of availability state of the second database server.

27. A first database server according to claim 21 where the first database server is adapted to store buffered transactions after data has been accumulated over predetermined quantity or predetermined time limit has been passed since the previous disk write operation.

28. A computer readable storage medium storing program instructions computer executable to cause a first computer database server to function for optimizing performance and data safety in a system comprising the first database server and at least one second database server coupled with a communication network, where the instructions when run in the first database server, cause the first database server to accept at least one transaction from a client application, store said transaction according to a data storage method, and send the transaction to the second database server via the communication network so that the second database server receives the data of the transaction to replicate the data of the transaction on the second database server before the data of the transaction is stored in persistent storage in the first database server, wherein:
the instructions, when run in the first database server, cause the first database server to i) receive information about the server availability state of the second database server, ii) detect a change in said availability state of the second database server, and iii) change the data storage method of the first database server, for storing the data of the transaction in a persistent storage, between buffered disk write and unbuffered disk write modes according to said detected change in the availability state of the second database server.

29. A computer readable storage medium according to claim 28 where the instructions cause the first database server to receive information about the server availability state of the second database server from at least one of the following: an external application, an internal application, and directly from said second database server.

30. A computer readable storage medium according to claim 28 where the instructions cause the first database server to change the availability state of the second database server from available to unavailable, when there exist problems in the second database server or in the communication network between the first and second database servers, and to change the availability state of the second database server from unavailable to available, when the second database server or the communication network between the first and second database servers are healthy.

31. A computer readable storage medium program product according to claim 28 where the instructions cause the first database server computer program change the data storage method from buffered to unbuffered disk write method, when the availability state of the second database server is changed to unavailable, and to change the data storage method from unbuffered to buffered disk write method, when the availability state of the second database server is changed to available.

32. A computer readable storage medium according to claim 28 where the instructions cause the first database server change the data storage method of the first database server automatically upon detecting a change of availability state of the second database server.

33. A computer readable storage medium according to claim 28, wherein the instructions are instructed by an external application to change the data storage method of the first database server upon detecting a change of availability state of the second database server.

34. A computer readable storage medium according to claim 28, wherein the instructions cause the first database server to store buffered transactions after data has been accumulated over predetermined quantity or predetermined time limit has been passed since the previous disk write operation.

35. A computer readable storage medium storing a watchdog application with program instructions computer executable for optimizing performance and data safety in a system comprising a first database server and at least one second database server coupled with a communication network, the first database server being adapted to accept at least one transaction from a client application, store said transaction in persistent storage according to a data storage method, said first database server being adapted to send the transaction to the second database server via the communication network and the second database server adapted to receive the data of said transaction to replicate the data of the transaction on the second database server before the data of the transaction is stored in the first database server, wherein:

the program instructions of the watchdog application cause the first database server to i) monitor the server availability state of the second database server, ii) detect a change in said availability state of the second database server, and iii) change the data storage method of the first database server, for storing the data of the transaction in a persistent storage, between buffered disk write and unbuffered disk write modes according to said detected change in the availability state of the second database server.

36. The computer readable storage medium storing the watchdog application according to claim 35 where the program instructions of the watchdog application cause the first database server to change the availability state of the second database server from available to unavailable, when there exist problems in the second database server or in the communication network between the first and second database servers, and to change the availability state of the second database server from unavailable to available, when the second database server or the communication network between the first and second database servers are healthy.

37. The computer readable storage medium storing the watchdog application according to claim 35 where the program instructions of the watchdog application cause the first database server to change the data storage method of the first database server automatically upon detecting a change of availability state of the second database server.

38. The computer readable storage medium storing the watchdog application according to claim 35 where the program instructions of the watchdog application cause the first database server to to change the data storage method of the first database server upon detecting a change of availability state of the second database server.

39. The computer readable storage medium storing the watchdog application according to claim 35 where the computer executing the program instructions of the watchdog application is either external or internal to the first database server the transaction to the second database server.

* * * * *